Patented July 13, 1937

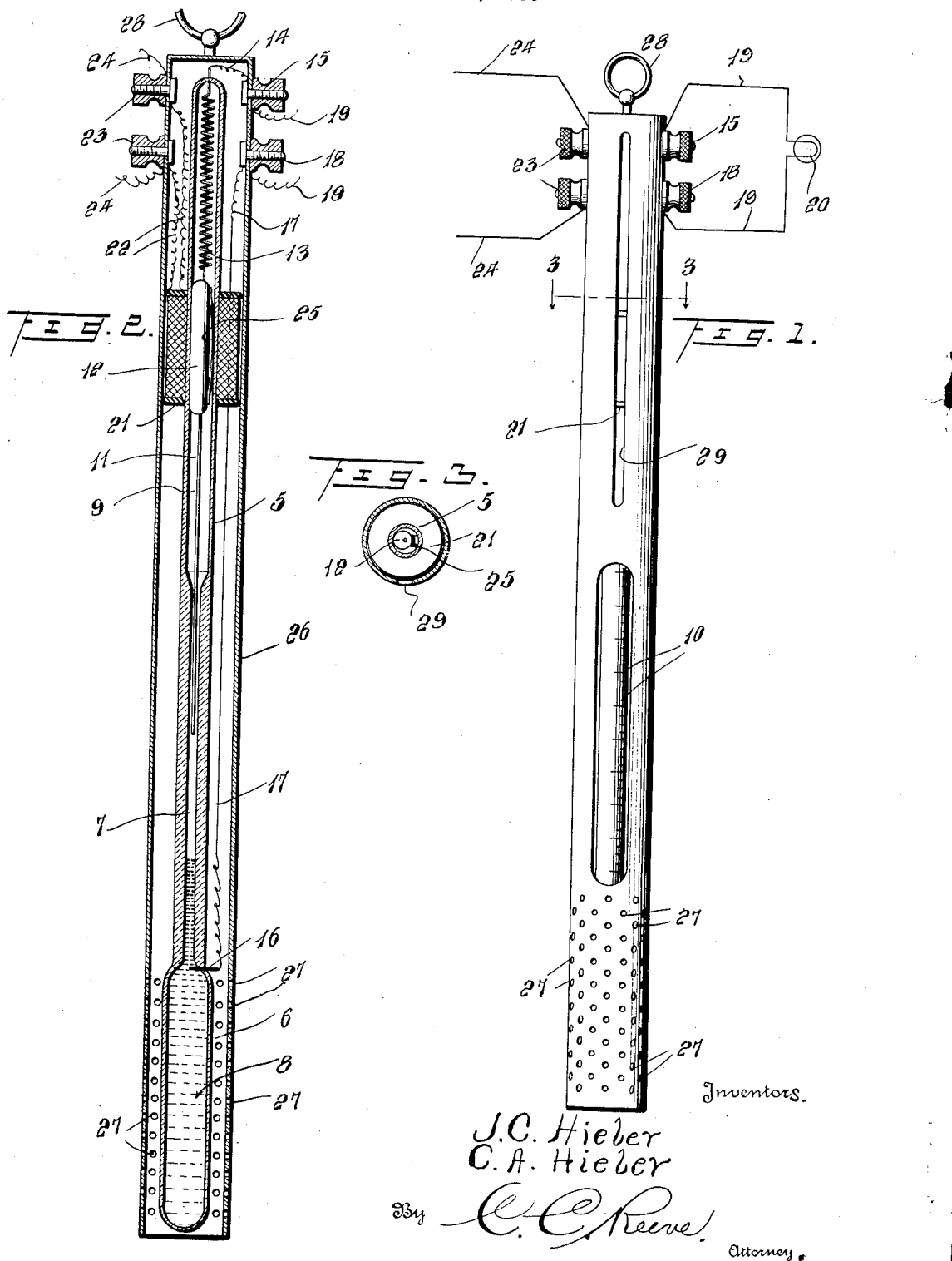

2,087,150

UNITED STATES PATENT OFFICE 2,087,150

ELECTRIC THERMOMETER

John C. Hieber and Cornelius A. Hieber, Richmond Hill, N. Y.

Application June 3, 1936, Serial No. 83,392

3 Claims. (Cl. 200—141)

This invention relates to certain new and useful improvements in electric thermometer.

The primary object of the invention is to provide an electric thermometer wherein a signal or control device is associated with a mercury thermometer and whereby a signal may be given or a relay controlled when a predetermined rise or fall of temperature is registered on the thermometer whereby a constant degree of temperature may be maintained.

A further object of the invention is to provide an electric thermometer of the foregoing character wherein the contact elements associated with the mercury thermometer may be set at will to permit closing thereof at any desired rise or fall of temperature as registered on the thermometer.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view of an electric thermometer constructed in accordance with the present invention, the glass tube mercury thermometer being enclosed in a tubular metallic casing;

Figure 2 is a vertical longitudinal sectional view of the thermometer carrying the adjustable contacts for the electric signal; and Figure 3 is a cross-sectional view taken on line 3—3 of Figure 1.

Referring more in detail to the accompanying drawing, the electric thermometer comprises a sealed glass thermometer tube 5 having a bulbous portion 6 for mercury at its lower end, an intermediate thickened wall section defining a relatively narrow bore or passage 7 through which the mercury 8 moves during expansion and contraction thereof and an upper thin wall section defining a relatively larger passage 9. The outer surface of the intermediate thickened wall portion of the thermometer tube 5 is graduated as at 10 as is customary with thermometers of this general type.

An electrical contact is adjustably mounted within the glass tube 5 for cooperation with the mercury that constitutes a cooperating contact for the closing of a circuit to control the degree of temperatures or sound an alarm or signal, the adjustable contact including an elongated wire 11 having a relatively large solenoid core 12 carried by the upper end thereof and suspended from the upper end of the thermometer tube 5 by a conductor coil spring 13, a wire 14 extending from the conductor coil spring 13 to a terminal 15. A second contact 16 is fixed in the thermometer tube 5 at the upper end of the mercury tube 6 and has a conductor wire 17 extending to a terminal 18, the terminals 15 and 18 having conductor wires 19 extending to an alarm or signal 20, or to a temperature control element, not shown.

The solenoid 21 for the core 12 that is located within a thermometer tube surrounds the thermometer tube as shown in Figure 2 and said solenoid or winding has conductor wires 22 extending to terminals 23 that have wires 24 leading to a source of electrical energy.

When the solenoid 21 is energized and slid over the thermometer tube 5, the core 12 within the tube that carries the wire contact 11 is attracted by the solenoid and is retained in its adjusted position against accidental displacement by means of the leaf spring 25 interposed between the core 12 and the glass tube 5 of the thermometer.

The mercury thermometer 5 and solenoid 21 are enclosed in a metallic tube or casing 26, the same being open at its lower end and perforated over the area thereof surrounding the mercury bulb 6, the upper end of the casing 26 supporting the terminals 15—18 and 23, while the upper closed end of the casing 26 is provided with a handle or lifting ring 28. The wire contact 11 may have the effective end thereof initially set with respect to the graduations 30 of the thermometer to effect the closing of the circuit to the signal 20 when the mercury 8 rises in the passage 7 of the thermometer tube for engagement with the contact 11, the initial setting of the wire contact being accomplished by first energizing the coil 21 and then shifting the same over the tube to cause the core 12 to move therewith and to assume a position as shown in Figure 2. To effect adjustment of the solenoid 21 within the metal casing 26, the latter is longitudinally slotted as at 29 to facilitate placement of a tool or implement into engagement with the solenoid as will be evident from an inspection of Figure 1. It is to be understood that the electric thermometer may be used as a controlling unit, such as to control any degree of temperature in conjunction with a suitable relay.

While there is herein shown and described the preferred embodiment of the invention, it is nevertheless to be understood that minor changes may be made therein without departing from the spirit and scope of the invention as claimed.

We claim:—

1. In an electric switch of the character described, a glass thermometer tube, a fixed contact extending into the tube adjacent the lower end thereof, an adjustable wire contact in the tube above the fixed contact and having a solenoid core at its upper end and a conductor coil spring for suspending the core from the upper end of the tube, a solenoid surrounding the thermometer tube and adapted to be slid on the tube and upon energization to move the core and wire contact therewith, said contacts and solenoid adapted to be connected with a source of energy.

2. In an electric switch of the character described, a glass thermometer tube, a fixed contact extending into the tube adjacent the lower end thereof, an adjustable wire contact in the tube above the fixed contact and having a solenoid core at its upper end and a conductor coil spring for suspending the core from the upper end of the tube, a solenoid surrounding the thermometer tube and adapted to be slid on the tube and upon energization to move the core and wire contact therewith, said contacts and solenoid adapted to be connected with a source of energy, and a metallic casing enclosing the thermometer tube and solenoid.

3. In an electric switch of the character described, a glass thermometer tube, a fixed contact extending into the tube adjacent the lower end thereof, an adjustable wire contact in the tube above the fixed contact and having a solenoid core at its upper end and a conductor coil spring for suspending the core from the upper end of the tube, a solenoid surrounding the thermometer tube and adapted to be slid on the tube and upon energization to move the core and wire contact therewith, said contacts and solenoid adapted to be connected with a source of energy, a metallic casing enclosing the thermometer tube and solenoid, and the casing being longitudinally slotted for exposing the thermometer graduations and permitting access to the solenoid for adjustment thereof.

JOHN C. HIEBER.
CORNELIUS A. HIEBER.